UNITED STATES PATENT OFFICE.

DAVID THOMSON, OF HERNE HILL, LONDON, ENGLAND.

PROCESS FOR THE PREPARATION OF DETOXICATED VACCINES.

1,409,796. Specification of Letters Patent. Patented Mar. 14, 1922.

No Drawing. Application filed November 21, 1919. Serial No. 339,605.

*To all whom it may concern:*

Be it known that I, DAVID THOMSON, a subject of the King of Great Britain and Ireland, and a resident of Herne Hill, county of London, England, have invented a certain new and useful Improvement in a Process for the Preparation of Detoxicated Vaccines, of which the following is a specification.

My invention relates to the preparation of vaccines from bacteria and allied organisms. The object of my invention is to produce vaccines which shall be free from the toxic properties which often lead to undesirable results exhibited in the local, focal, and general reactions characteristic in each particular case, and to avoid such reactions or to reduce them to a minimum. That is to say, the present invention aims to provide a process for obtaining the antigenic substance from the bacteria freed from the endotoxins or powerful poisons of the germs so that a larger dose of the vaccine may be administered. The present invention therefore contemplates the freeing of the endotoxins and the removal in the manner hereinafter described.

In accordance with my invention I take the sedimented or centrifugalized bacteria in the form of a semi-solid mass and treat this mass with the aqueous solution of an alkali. This has the effect of dissolving the bacteria. In the solution thus formed I now add an acid, such, for example, as hydrochloric acid until the liquid is slightly acid. The bacterial substance is by this means precipitated from the solution. The supernatant fluid is decanted, and the remaining precipitate is re-dissolved in alkali and again precipitated by means of an acid. The supernatant fluid in each case retains a proportion of the obscure substance which possesses the toxic properties. The process of re-solution of the precipitate in alkali and re-precipitation by means of acid is repeated several times, if necessary, until the supernatant fluid no longer gives a precipitate on the addition of picric acid, which I find to be an effective test for the existence of the toxic bodies. The precipitate finally resulting may be re-dissolved in a slightly alkaline solution or may be shaken up in a slightly acid solution, and after standardization to the required strength is suitable for injection into the patient.

As an example the invention may be applied to the preparation of a vaccine from the gonococcus. The germ is collected in quantity from cultures in the form of an emulsion and thrown down by sedimentation assisted if necessary by centrifugalization. A quantity of solution of NaOH about equal in quantity to that of the germ mass is now added. The alkaline solution should be only just sufficiently strong to dissovle the germ; if too strong it might alter the chemical composition of the germ. It is therefore better to use weak alkali and allow it to act slowly at blood heat than to dissolve rapidly in strong alkali. NaOH $\frac{N}{10}$, i. e. 0.4% may be used. After complete solution dilute HCl sufficient to acidify the solution is added. It may be noted that the alkaline solutions of certain germs throw down their precipitate on the addition of acid only with some difficulty; in such cases the precipitation is encouraged by the use of a solution of HCl containing NaCl. I have used $\frac{N}{5}$ HCl containing 2.5% NaCl. If the solution contains more than 5% NaCl, it is liable to precipitate the toxin along with the rest of the germ substance. The precipitation is encouraged by centrifugalization and it may be noted that it occurs more readily in concentrated solutions of the germ than in weak solutions; so it is important in the initial stages to dissolve a maximum amount of germs in a minimum amount of alkaline fluid. The first precipitate obtained by means of the acid dissolves in alkali more rapidly than did the original germ substance, and accordingly subsequent solution and re-precipitation may be effected by means of weaker alkali and acid than were employed in the earlier stages.

I have further discovered as an alternative to repeated solution with alkali and re-precipitation with acid, that it is possible to complete the removal of the toxin by washing the first precipitate obtained with a weak acid such as 0.5% solution of acid sodium phosphate $NaH_2PO_4$. It is possible that other weak acids may give a similar result.

I now proceed to give a specific example of the preparation of a vaccine by my method:—

(1) A quantity of gonococcus germs forming a semi-solid mass about half an inch in depth at the bottom of a centrifugal tube was mixed with an equal bulk of $\frac{N}{10}$ NaOH and placed in the incubator overnight. In the morning the germs were found dissolved.

(2) The tube was filled up with a solution of $\frac{N}{5}$ HCl plus 2.5% NaCl. A white precipitate was thrown down. The tube was placed in the centrifugal machine to drive all the precipitate to the bottom. The supernatant fluid was removed with a pipette.

(3) 0.5% solution of $NaH_2PO_4$ was added to the precipitate, the tube was shaken up thoroughly, again placed in the centrifugal machine, and the supernatant fluid again withdrawn with the pipette. This washing with $NaH_2PO_4$ was repeated four or five times when the supernatant fluid showed no precipitate with picric acid. The detoxication was now considered complete.

(4) The precipitate was collected and mixed with a solution containing 0.5% solution of $NaH_2PO_4$ plus 0.5% carbolic acid; it was standardized to a strength of ten thousand millions per cubic centimetre and was ready for use as an injection.

I have found that the standardization may be effected with sufficient accuracy for ordinary purposes in the following way:—A bulk of germs somewhat larger than taken for the preparation of the vaccine is diluted with say 25 c.cm. of water, and the fluid, after shaking thoroughly, is counted against blood corpuscles in the manner well known. The fluid is further diluted, if necessary, until it shows a strength of, say, ten thousand millions per cubic centimetre. The amount of water which has had to be added to the mass of germs to give this result is noted. When the final precipitate has been prepared by the method above described, a bulk of it is taken which is equal in bulk to the mass of germs of which the solution and count had been noted, and this bulk is dissolved in a bulk of alkaline solution or is mixed with a bulk of $NaH_2PO_4$ solution, equal to that required to dilute the first mass of germs to the count required. This method is somewhat empirical but I find that it meets practical requirements. Other methods will suggest themselves to the practical bacteriologist.

I claim:—

1. In the preparation of vaccines, the process which consists in dissolving the germs in an alkaline solution to free the antigenic portion of the germ from the endotoxic portion thereof, next precipitating the antigenic germ substance with an acid, and subsequently decanting off the endotoxic element of the germ with the acid.

2. In the preparation of vaccines, the process which consists in dissolving the germs in an alkaline solution to free the antigenic portions thereof from the endotoxins, next precipitating the antigenic germ substance with an acid, next decanting off the endotoxic element in solution with the acid and subsequently washing the precipitate with a weak acid such as $NaH_2PO_4$.

In testimony whereof I have affixed my signature hereto this 20th day of October 1919.

DAVID THOMSON.